INVENTORS
PHILIP JUNG
RICHARD J. MURRAY
BY Gunter A. Hauptman
ATTORNEY

March 1, 1966 P. JUNG ETAL 3,238,506

COMPUTER MULTIPLEXING APPARATUS

Filed June 27, 1961 8 Sheets-Sheet 2

FIG. 3 X SET REGISTER
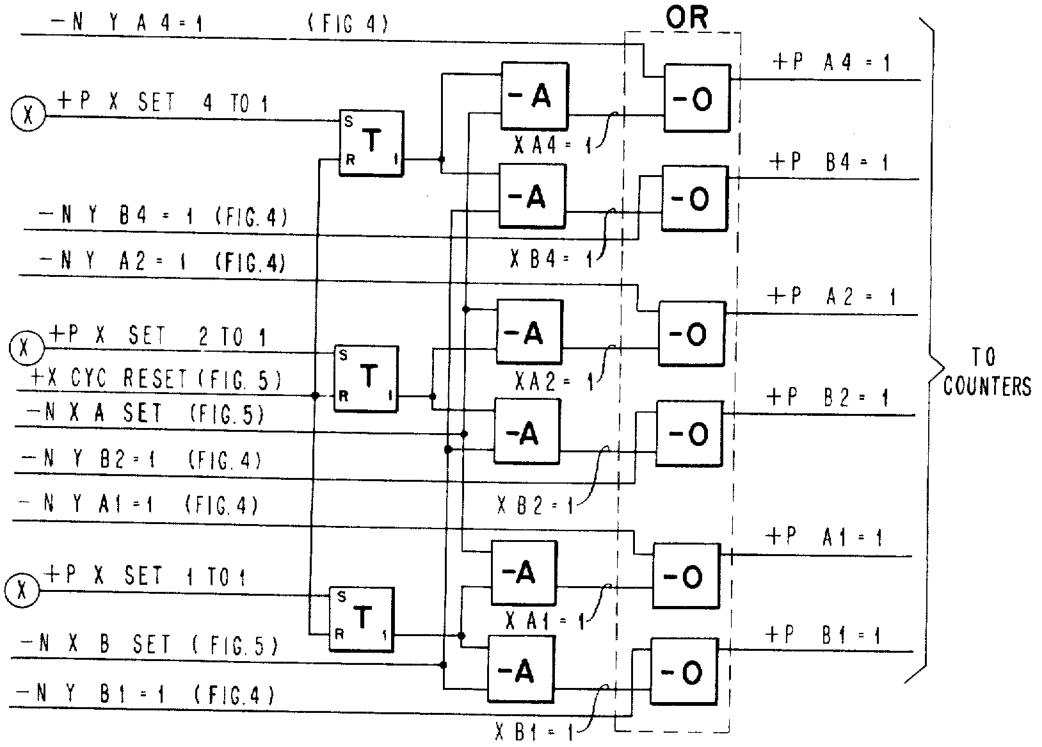
FIG. 4 Y SET REGISTER
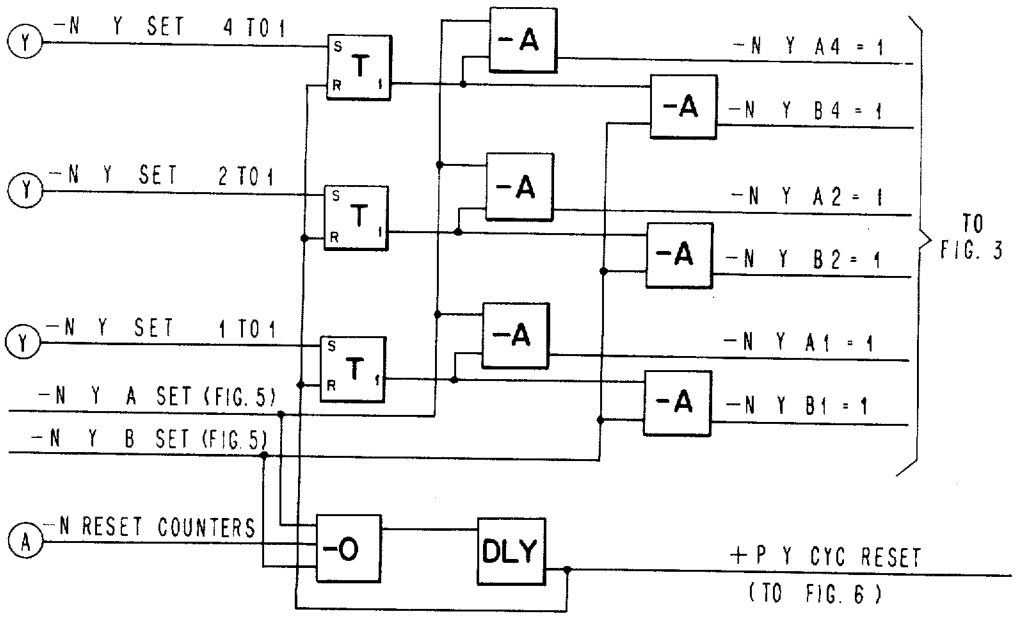

COUNTER SET CONTROLS

COUNTER SET CONTROLS

FIG. 7 COUNTER STEP CONTROLS
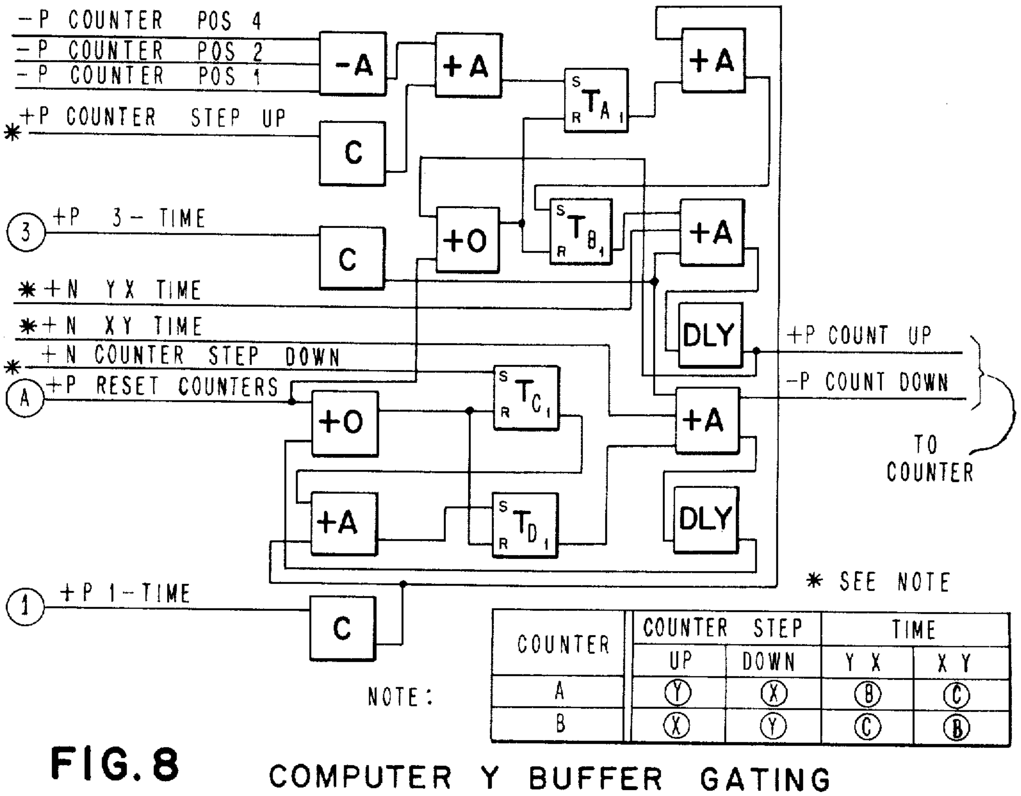
NOTE:
| COUNTER | COUNTER STEP | | TIME | |
|---|---|---|---|---|
| | UP | DOWN | Y X | X Y |
| A | Ⓨ | Ⓧ | Ⓑ | Ⓒ |
| B | Ⓧ | Ⓨ | Ⓒ | Ⓑ |
FIG. 8 COMPUTER Y BUFFER GATING
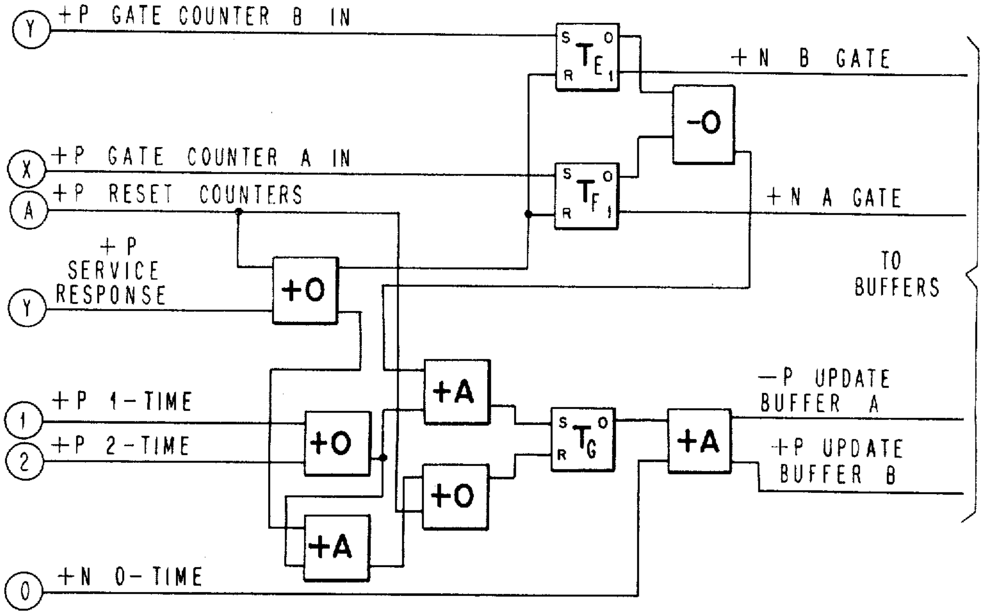

3,238,506

COMPUTER MULTIPLEXING APPARATUS

Philip Jung, Poughkeepsie, and Richard J. Murray, Verbank, N.Y., assignors to International Business Machines Corporation, New York, N.Y., a corporation of New York Filed June 27, 1961, Ser. No. 125,623
4 Claims. (Cl. 340—172.5)

This invention relates to electronic apparatus and more particularly to improved apparatus for multiplexing computers.

The invention to be described is an improvement over the apparatus disclosed in the patent application entitled, "Computer Multiplexing Apparatus," Serial No. 40,091, filed June 30, 1960, J. E. Griffith et al., and assigned to the International Business Machines Corporation. In the Griffith et al. application, multiplexing is achieved by the provision of counters, each of which coordinates the execution of programs in two adjacent computers solving a problem. In the simplest case, one counter is associated with two computers. Either computer can count the counter up or down, or set it to any value. When the counter reaches certain predetermined counts, preset events may occur. Thus a different one of a group of subroutines may be executed for each counter setting. Further, the counter relates the actual time it takes each computer to execute portions of its program with the execution steps of the other computer. Neither machine is wholly dependent upon the other for the control of problem processing, either computer being able to request assistance from the other computer and transfer problem portions to the other for solution. Decisions to render assistance are based upon the counter contents, which take into consideration both the necessity of interrupting the computer's processing and the consequences of interruption.

In the Griffith et al. application, the counter supplied adjacent to two computers is usually counted down by one computer and counted up by the other computer. The number of counts requested by a computer are indicative of the progress of that computer through its program. Therefore, computer "A" steps the counter up every time it finishes a predetermined portion of its problem solving program, and computer "B" steps the counter down every time it finishes a predetermined portion of its problem solving program. If computer "A" steps the counter up faster than computer "B" steps the counter down, it is obvious that computer "A" is progressing through its program more rapidly than computer "B," and that computer "B" is in need of assistance in the execution of its program. Therefore, if the counter contents exceed a specified value (say, for example, six) then computer "B" may transfer a portion of its problem to computer "A" for simultaneous solution with the execution of the program remaining in computer "A." Similarly, if computer "B" steps the counter down faster than computer "A" steps the counter up, at some point the counter will reach the value zero (or some other specified minimum value), indicating that computer "B" may assist computer "A" in the execution of its program. When the counter reaches the predetermined value, indicating that computer "B" is in need of assistance, a separable part of the program of computer "B" is transferred to computer "A" for simultaneous solution with the remaining program of computer "B."

It is therefore evident that in the Griffith et al. application either computer "A" or computer "B" may transfer a portion of its program to the other computer for simultaneous execution with the remaining portion of its program. The contents of the counter indicate the point of transfer, one number indicating transfer from computer "A" to computer "B," and another number indicating transfer from computer "B" to computer "A." However, though the counter indicates points of transfer, it does not indicate readiness to process: the mere fact that computer "A" has transferred a portion of its program to computer "B" does not insure that computer "B" will process that program. One solution is to assume readiness to process by interrupting the program of computer "B" for processing the portions transferred by computer "A." However, this may interfere with computer "B's" operation, since it could very well cause the interruption of a program having a higher priority than the transferred program. Similarly, computer "B" may transfer a portion of its program to computer "A" for simultaneous execution with the remaining portion of the computer "B" program though computer "A" is not at an advantageous point to process the transferred program. A problem also arises if computer "B" transfers a number of program portions to computer "A" which exceeds the storage and processing capacity of computer "A." As a result, a single counter cannot coordinate both the transfer of programs between adjacent computers and the processing of the transferred programs.

It is often necessary to process information stored on magnetic tapes and print the results on paper. Intermediate processing steps include code conversion of the information stored on the magnetic tape, arithmetic operations on the converted information (for instance, payroll), editing of the arithmetic results (to eliminate leading zeroes, etc.) and then printing. Commonly, a separate small computer is utilized for tape reading, code conversion, editing and printing, a larger computer being used for the computations. Information is read from the tape into the small computer for code conversion and then is read onto another tape, which second tape must be manually transferred to the larger computer which performs computations and then stores the results on still another tape. The third tape is then manually transferred back to the small computer for editing and printing. Such a system is quite slow due to the non-simultaneous operations and the necessity of manual steps.

The apparatus disclosed in the Griffith et al. application permits the performance of such functions automatically and simultaneously by controlling the point of transfer between the two computers in accordance with the relative progress of the operations in the two computers. Recognition by one counter of the needs and readiness of two computers for bi-directional transfers is possible (by setting values into the counter at certain times) but is very complicated, though recognition of the transmission needs of one computer and the receiving readiness of the other computer for uni-directional data transfer is easily accomplished with one counter. The apparatus disclosed herein is an improvement over the Griffith et al. application in that it permits the automatic and simultaneous performance of bi-directional transfers in accordance with the needs of whichever computer wishes to transmit and the readiness of whichever computer wishes to receive.

It is therefore an object of this invention to provide apparatus which permits a plurality of computers to optimumly work together on the solution of problems.

Another object is to provide apparatus which permits a group of computers to coordinate the inter-computer transfer and the processing of portions of a joint problem.

A futrher object of this invention is to permit any one of a group of computers simultaneously solving one problem to transmit at optimum times a portion of the problem to another computer and to utilize at optimum times portions of the problem received from other computers.

A still further object is to provide apparatus which permits computers involved in the solution of a problem to sense each others progress for the purpose of determining the point of transfer of portions of the problem among said computers.

Another object of this invention is to provide an apparatus for multiplexing two computers to permit both to control and process data transferred in either direction between the computers in accordance with the needs and readiness of both computers.

A further object of this invention is to provide apparatus for multiplexing two computers to permit either computer to transfer to the other parts of a problem for solution simultaneously with the untransferred parts of the problem at times when one computer has problem parts to be transferred and the other computer is able to receive said parts.

The foregoing and other objects, features and advantages of the invention will be apparent from the following more particular description of the preferred embodiments of the invention, as illustrated in the accompanying drawings.

The objects are achieved by the provision of two counters for each adjacent pair of computers. Either computer can count either counter up or down or set into it any value. Either computer can interrogate either counter to determine its value. In the simplest case one counter (A) coordinates the transfer of information in one direction between two computers (X and Y) and another counter (B) coordinates the transfer of information in the other direction between said two computers. When the counter B reaches a certain value it causes the transfer of information from computer X to computer Y. When counter B reaches another value it causes computer Y to process the received information in place of its usual program. When counter A reaches a predetermined value it performs a transfer from computer Y to computer X, and when it reaches another value it causes the computer X to process the information.

Thus, for example, computer X and computer Y may work together on a tape-reading, information-processing, editing and printing problem. Computer X reads information from the tape and does code conversion. It may transfer part of the code conversion problem to computer Y, if necessary. Subsequently it will transfer the results of the code conversion to computer Y for processing of the information, after which computer Y transfers the processed information back to computer X for editing. Part of the editing problem may be done by computer Y if computer X is too busy doing tape-reading. Computer X supplies the finally processed information to the printer.

In the figures:

FIGURES 1*a* and 1*b* are drawings illustrating two embodiments of the invention.

FIGURES 1*c* and 1*d* are block diagrams of the embodiment of the invention shown in FIGURE 1*a*.

FIGURES 2 through 8 are logic diagrams of devices usable in the block diagrams of FIGURES 1*c* and 1*d*.

Figure 1A:
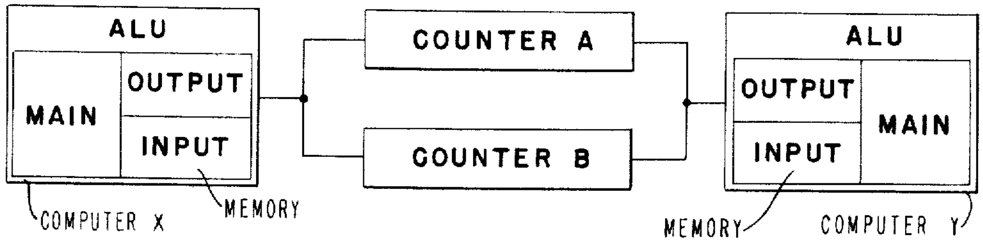
Figure 1B:
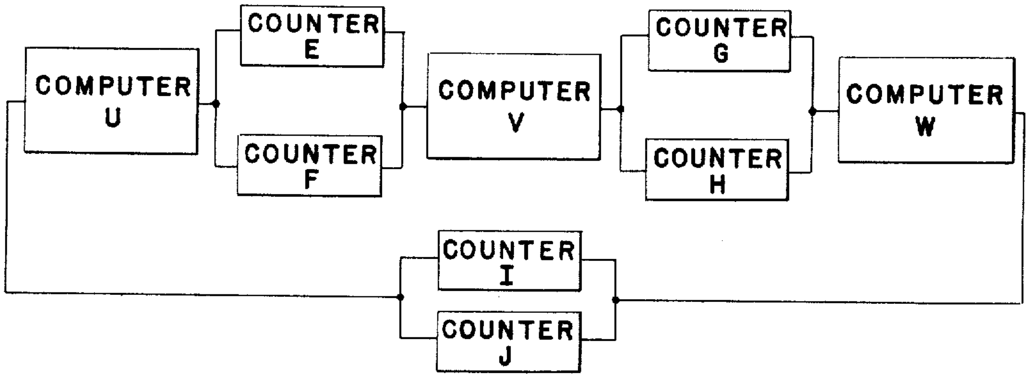
Figure 1C:
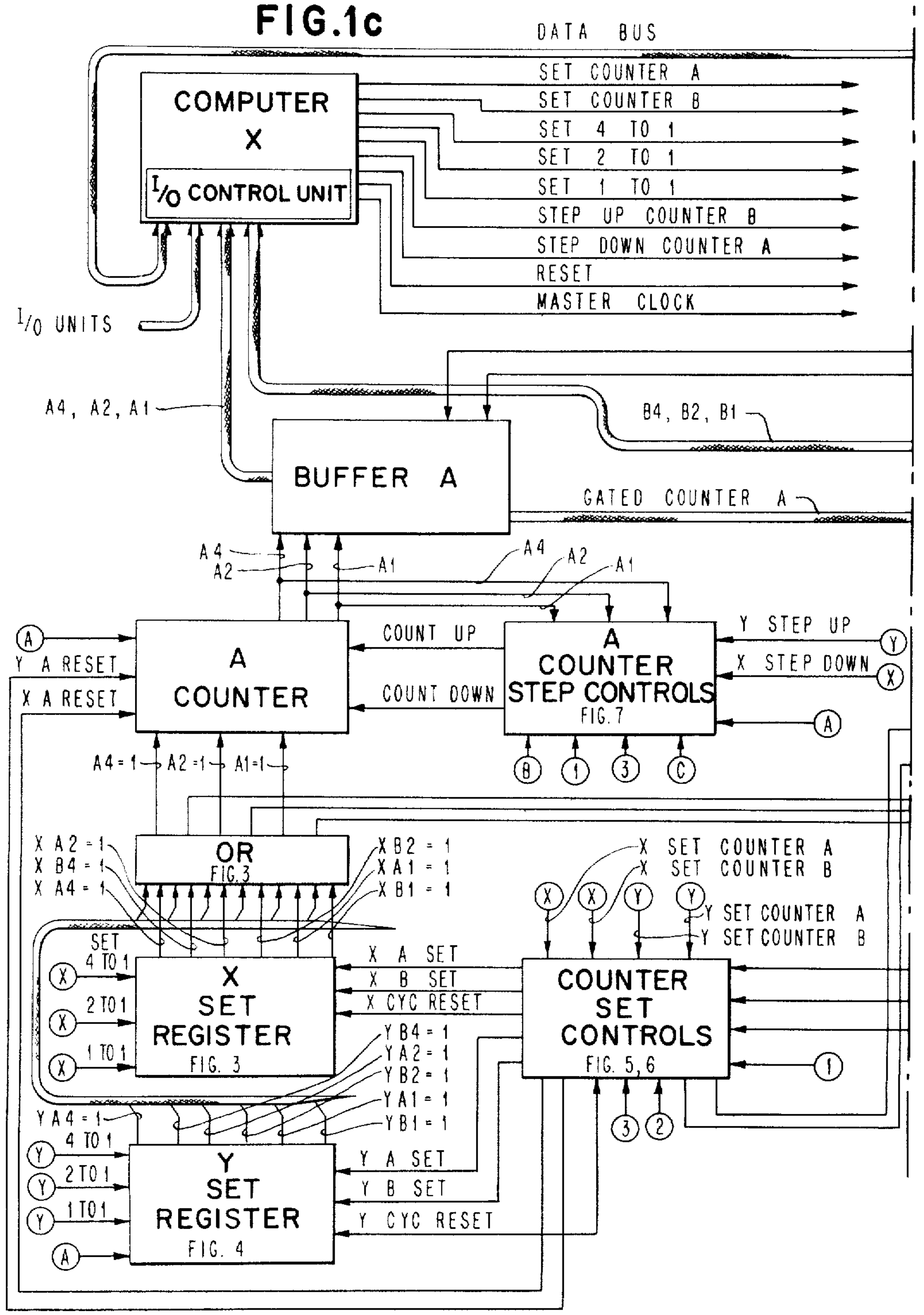
Figure 1D:
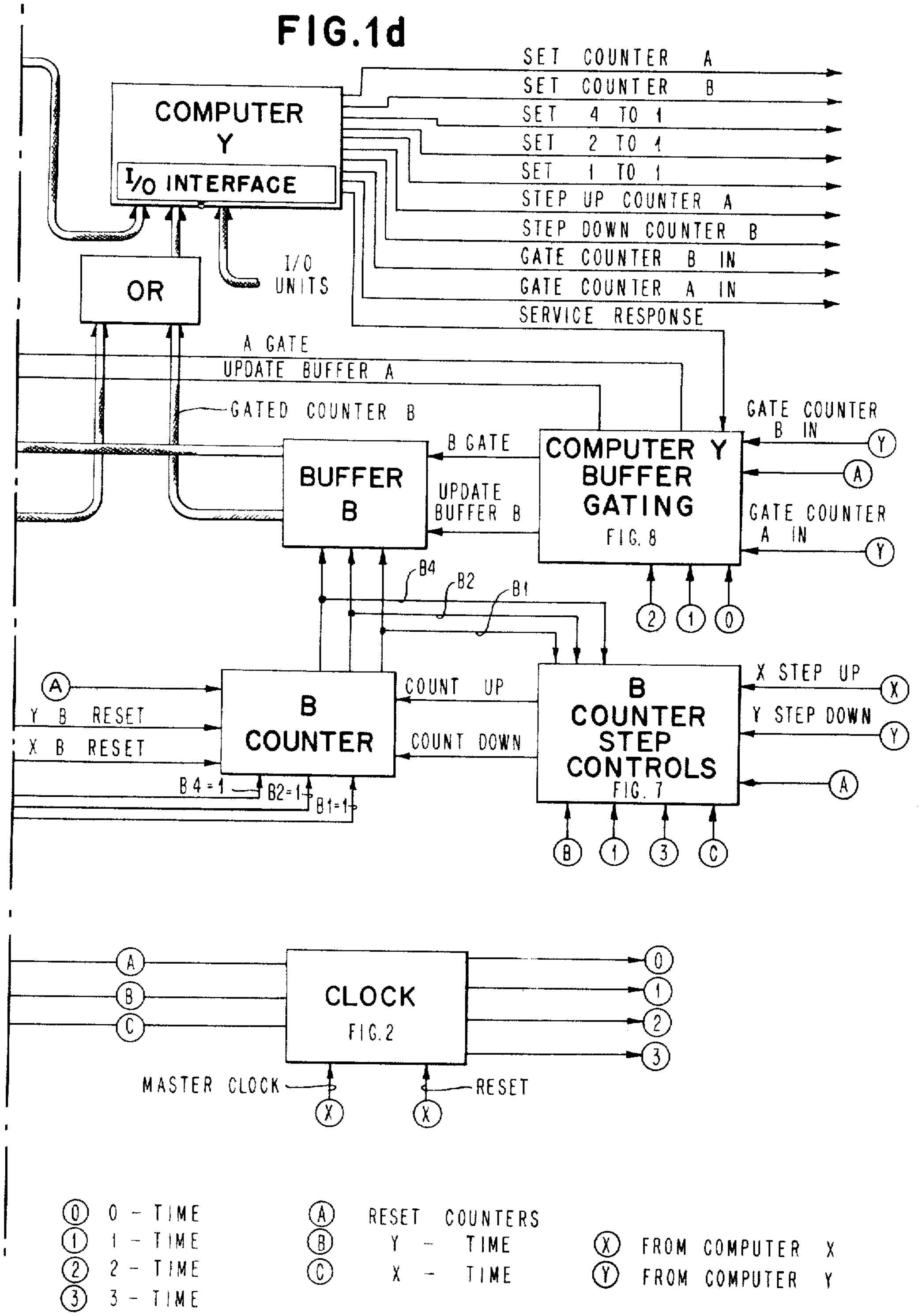
Figures 10A, 10B:
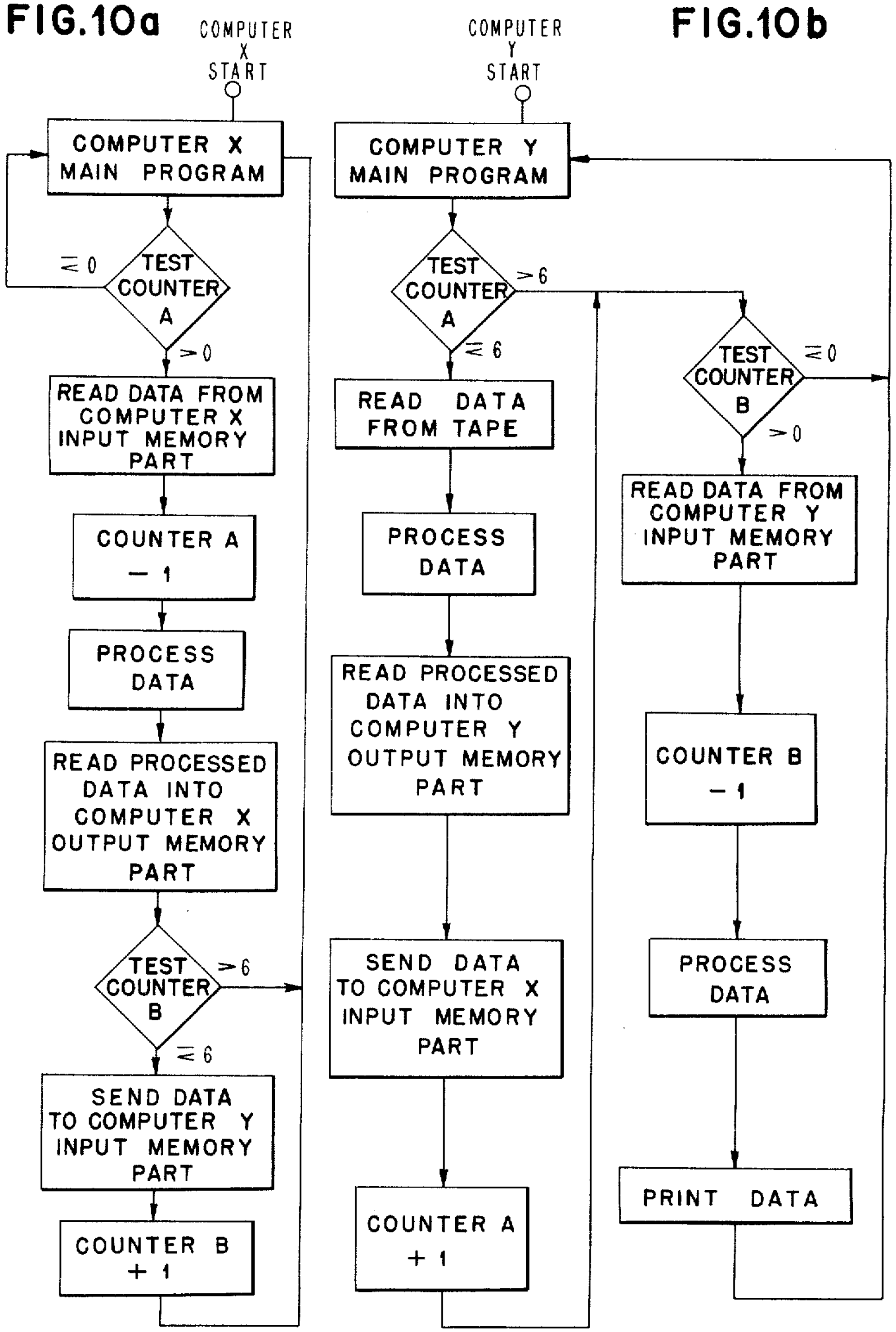

FIGURES 10*a* and 10*b* are flow diagrams of the operation of the embodiment shown in FIGURES 1*a*, 1*c* and 1*d*.

GENERAL DESCRIPTION

Referring to FIGURE 1*a*, there is shown one embodiment of the invention comprising a computer X, a computer Y, a counter A and a counter B. Either one of the computers (X or Y) can step either one of the counters (A or B) up or down by any amount. Further, either one of the computers can set a value into either one of the counters, and either one of the computers may sense the contents of either one of the counters. Each computer is for purposes of illustration only, divided into an arithmetic and logic area (ALU) and a memory made up of main, input and output parts. As each one of the computers X and Y progresses through the program of instructions contained in its main memory part it causes the adjustment of selected ones of the counters by selected amounts. The instructions of each of the computers are such that the programmer may specify the identity and the adjustment of the counters. Further, the programmer may specify the examination of certain ones of the counters at indicated points in the program, or, an automatic examination using an interrupt scheme may control counter sensing. Thus, each computer has complete control over either of the counters and each computer is able to interrogate each counter.

The number of uses to which such a system may be put by a programmer are numerous. The use of the invention illustrated herein is to control the transfer of portions of the programs between and within computers. For instance, counter A may be used to control the transfer of information from the main memory part of computer Y to the output memory part of computer Y, from this output memory part to the input memory part of computer X, and from this input memory part to the main memory part of computer X. Computer B is then used to control the transfer of information from the main memory part of computer X to the output memory part of computer X, and from the computer X output memory part to the computer Y input memory part and from this input memory part to the associated main memory part. If each of the computers X and Y is viewed as independently executing a program having instructions which specify the control and sensing of the counters, then it is possible for the counters to specify the point at which the computers transfer portions of their programs between each other and within themselves.

Still referring to FIGURE 1*a*, computer X and computer Y may separately execute programs contained in the main parts of their respective memories. When a difficult portion of a program is reached by either or both of the computers each may transfer a portion of the program, which portion it would like to have executed by the other computer, to an area in its own output memory part. These output areas may be divided into a number of blocks so that each time a difficult sharable program portion is reached it is put into a separate block. Each computer thus builds up a number of program blocks to be transferred to the other computer for simultaneous solution. The main memory part to output memory part transfers may occur at any time or they may be conditioned upon the contents of the counters. Before any transfer occurs between computers each computer must interrogate the counter associated with the direction in which it wishes to transfer. Thus, computer Y interrogates counter A to determine whether it may transfer one or more of the blocks of programs in its output memory part into the input memory part of computer X, and, computer X examines counter B to determine whether it may transfer some of the program blocks stored in its output memory part to the input memory part of computer Y. If there are allotted a number of input memory parts in each computer for receiving information to be processed from the other computer then the contents of each counter indicates the number of input memory parts free to receive information in an assigned direction. Assume that computer Y has seven areas in its output memory part for storing programs which it would like to transmit to computer X and that computer X has seven areas in its input memory part for receiving these programs. Further, computer X has seven output memory part areas for holding programs that it wishes to transfer to computer Y and computer X has seven input memory part areas for receiving these programs. The contents of counter A then designate the number of input receiving areas in computer X which are free, and counter B designates the number of input receiving areas in computer Y that are free.

When computer Y senses that counter A is less than seven it transmits a program block from one of its output memory part areas to the receiving area of computer X and steps up the counter A to indicate that one additional computer X input area has been filled. If computer Y senses that counter A is seven it recognizes this as indicating that computer X has no room in its input receiving areas and, therefore, must not transfer any information to computer X. In a similar manner, computer X senses the contents of counter B to determine whether there is any room in the input memory part receiving areas of computer Y. If counter B is less than seven, indicating that there is room in the input receiving areas of computer Y, computer X transmits information to computer Y and steps up counter B.

Each of the computers may process information transmitted to it by the other computer. To do this it must recognize whether any of its own input receiving areas contain information or not. If at least one receiving area contains information the computer processes it and steps down the counter associated with that input memory part to indicate to the other computer that one additional input area is free to receive programs. For example, if computer Y interrogates counter B and finds that counter B is more than zero, indicating that at least one of its input memory part receiving areas has been filled by computer X, it removes the information from the first receiving area filled by computer X, steps counter B down by one and processes the information. Similarly computer X examines counter A to determine whether there is any information stored in its own input receiving areas. If counter A is more than zero computer X uses a block of information and steps down counter A.

In summary, each counter may be examined and counted for at least two purposes: (a) to indicate to a transmitting computer that input areas in the receiving computer are available for reception, and (b) to indicate to a receiving computer that its input areas contain information to be processed. Each counter could also be interrogated by a computer to determine whether its output areas are available to receive information for later transmission to the other computer.

Counter A is examined by computer Y to determine whether computer Y may transmit a portion of its program to computer X. If counter A indicates that there is some free area in the input receiving areas of computer X, then computer Y transmits information into computer X, stepping up the contents of counter A to indicate that there is one less receiving area in computer X. Computer X examines counter A to determine whether any information has been transmitted to computer X by computer Y. If counter A indicates that there has been a transfer of a portion of the program of computer Y to computer X for solution, computer X will execute the portion of the transferred program and step down the counter A by one to indicate that there is an additional input area available in computer X. Similarly, counter B is sensed by both computer X and computer Y and counted up by computer X every time computer X transfers a portion of its program to computer Y and counted down by computer Y every time computer Y executes a portion of the program transferred by computer X.

Referring to FIGURE 1*b*, there is shown another embodiment of the invention comprising a plurality of computers linked by a plurality of pairs of counters. Any pair of adjacent computers, such as U and V, or V and W, or W and U, may act in the manner of computers X and Y in FIGURE 1*a*. Since independent pairs of counters are provided, it is possible for information transfers to occur between computers U and V under the control of counters E and F at the same time that there are transfers between computers V and W under the control of counters G and H and between computers W and U under the control of counters I and J. It is possible for information to be transferred among computers U, V and W automatically in any combinations desired. For example, the upper counters E, G and I may control transfers in one direction between adjacent computers while the lower counters F, H and J control the transfer of information in the other direction between adjacent computers. Computer U may pass off a portion of its program to computer V for solution. Computer V may decide that it cannot execute this portion of the program and will pass it on to computer W. Computer W may have an operation best suited for solution by computer U, in which case it will transfer it to computer U. It is obvious that any number of computers and counters may be utilized.

The operation of the invention will now be described with reference to the embodiment illustrated in FIGURE 1*a* and the flow diagram of FIGURES 10*a* and 10*b*. Each computer input memory part is divided into seven areas, each area being capable of holding one block of data sent from one of seven areas in the output memory part of the other computer. The main memory part of each computer holds the programs and data required to execute its allotted operations. The division of memories into parts and areas is purely illustrative.

Counter A is, in this example, capable of counting from zero to seven, indicating the number of areas in the input memory part of computer X free to receive data. Counter B, which also counts from zero to seven, indicates the number of areas in the input memory part of computer Y available. If counter A is more than zero, then there is information in the input memory part of computer X which should be processed by computer X. If counter A is six or less, then there is room in the input memory part of computer X for additional information. Similarly, counter B indicates by its contents whether there is any information in the input memory part of computer Y (more than zero) and whether there is room for additional information in the input memory part of computer Y (six or less).

The operations performed by computers X and Y are the transfer of information from magnetic tape to computer Y for initial processing (for instance, code conversion), the transfer of the initially processed data to computer X for additional processing (for instance, payroll calculation) and the return of the additionally processed data to computer Y for editing (for instance, removal of leading zeroes) and for printing by a printer. Each computer may in addition execute a number of other related, or unrelated, programs during the intervals when the problem described here does not require the services of one computer or the other. These alternative programs, included within the "main programs," are continuously available to the associated computers and are interrupted when the operation described herein requires a computer. The counters may be used to indicate the point of interruption.

Referring to FIGURE 10*b*, computer Y operates in accordance with its main program, which may be any number of operations unrelated to the operations described here, until the main program of computer Y is interrupted for processing information from magnetic tape or for preparing data prior to printing. These points are determined by instructions in computer Y which test the counters, or by automatic counter-monitoring program interrupt means. Initially computer Y tests the counter A. If the counter A contents are equal to six or less than six there is room in the input memory part of computer X for some of the data, if any, in the output memory part of computer Y. Therefore, computer Y reads a data block from tape, initially processes this data block (code converts it, etc.) and then reads the initially processed data block into one area of its own output memory part, from where it is transmitted to one area of the computer X input memory part. No further interrogation of the counter is necessary at this time since it is known that the computer X input memory part has room for this block of information. For each block of information read into an area of the input memory part of computer X the counter A is increased by one. Only seven areas in the input memory part of computer X are alloted for the reception of information from computer Y. When the counter is stepped to seven this is recognized as indicating that all areas of the input memory part of computer X are filled. Therefore, the computer Y operation so far described would not have occurred if the test of counter A had indicated that the contents of counter A were more than six. In such a case the operation described in the next paragraph will occur immediately.

After each increment of counter A (or if counter A contains the number seven) the counter B is tested. If the contents of counter B are more than zero it indicates that the computer Y input memory part has information stored in it, which information was transferred to computer Y by computer X as will be described. One block of this information is read from the computer Y input memory part and the counter B is stepped down by one to indicate that there is one additional area empty in the input memory part of computer Y. This data block is processed (in this case it is edited) and the processed information is sent to a printer associated with computer Y. The main program of computer Y is then entered. If the test of counter B had indicated that the contents of counter B were equal to or less than zero it would have indicated that there was no information in the input memory part of computer Y to be processed. In such a case the computer Y main program would have been immediately entered.

In summary, computer Y processes a main program which is interrupted in accordance with the contents of counter A and counter B to initially process blocks of data from magnetic tape, transfer the initially processed blocks of data to computer X for further processing and then receive information processed by computer X for final processing and transfer to a printer. It is obvious that these operations may be performed in many ways other than those illustrated in FIGURE 10*b*.

Referring to FIGURE 10*a*, computer X has been operating at the same time as computer Y. Computer X begins at the point marked "Computer X Start," and enters its main program. The contents of counter A are tested. If the contents of counter A are equal to or less than zero (indicating that there is no information in the input memory part of computer X), the main program is immediately re-entered since there is no information to process. If the counter A contents are more than zero, then the computer X is notified that there is information in its own input memory part. A block of this data is read from the computer X input memory part and the counter A is stepped down by one to indicate that this one block of information has been removed. The block of data is processed by computer X and the results are read into one area of the computer X output memory part for future transfer to computer Y. The counter B is next tested to determine if there is any room in the input memory part of computer Y to receive blocks of data. If the contents of counter B are equal to or less than six, there is room in the input memory part of computer Y to receive at least one block of information and the data in the output memory part of computer X will be transferred to the input memory part of computer Y. Counter B is then incremented by one and the main program of computer X is re-entered. The information stored in the output memory part of computer X is not transferred to computer Y if a test of counter B (contents more than six) indicates that there is no room in the input memory part of computer Y. In this case the main program of computer X will be entered immediately after counter B is tested.

In summary, computer X tests counter A to determine whether computer Y has transferred any information to the computer X input memory part for processing, processes this information and transfers the processed information to its output memory part for return to the input memory part of computer Y at a time convenient for computer Y. It is obvious that many ways to achieve these functions are possible.

Only one example of the operation of this invention has been described. A large number of other uses of this invention will be obvious to those skilled in the art.

DETAILED DESCRIPTION

Referring now to FIGURES 1*c* and 1*d*, there appears a detailed block diagram of the embodiment of the invention shown in FIGURE 1*a*. Computers X and Y are able to sense and control counter A and counter B. Computer X and computer Y may be any kind of computers manufactured, either identical or different. For purposes of illustration computer X is chosen to be one having an input/output (I/O) control unit for controlling the transfer of information between computer X and external devices. Computer Y is a considerably less expensive computer not having an I/O control unit. External devices communicate with computer Y through an I/O interface. Computer Y and computer X communicate information between each other on a data bus between the I/O control unit of computer X and the I/O interface of computer Y.

Instructions in the programs of each of the computers cause signals to be generated upon indicated output lines. The output lines of computer X will be described first. The line SET COUNTER A has a signal on it when it is desired to set the counter A in accordance with information supplied by computer X. The SET COUNTER B line carrier a signal when it is desired to set counter B to the contents indicated by computer X. The lines: SET 4 TO 1, SET 2 TO 1 and SET 1 TO 1 carry signals represenative of the desired settings of the A or B counters indicated by the lines SET COUNTER A or SET COUNTER B. The line STEP UP COUNTER B permits computer X to increment the counter B by one. The line STEP DOWN COUNTER A carries a signal when it is desired to decrement the counter A by one. The line RESET carries a signal when it is desired to reset the entire apparatus. The line MASTER CLOCK carries signals at regular intervals to control the operation of the apparatus.

Computer Y also has control output lines for permitting its program to exercise control over the apparatus. The lines SET COUNTER A and SET COUNTER B set the indicated counters in accordance with signals on the following lines: SET 4 TO 1, SET 2 TO 1 and SET 1 TO 1. The computer Y may increment the counter A by means of a signal on the line STEP UP COUNTER A and it may decrement counter B by means of a signal on the line STEP DOWN COUNTER B. Computer Y may sense the contents of either counter B or counter A by placing singals on the proper ones of the lines GATE COUNTER B IN or GATE COUNTER A IN. The SERVICE RESPONSE line indicates when computer Y has fully sensed the desired counter contents.

Computer X, having an I/O control unit, does not require a specific signal to sense the contents of the counters. It automatically senses the contents of the counters substantially continuously. Computer X reads both counters A and B into its control unit at the same time, and not separately as done by computer Y. Obviously, this difference is a matter of choice and is intended to illustrate the use of different kinds of computers.

Computer X and computer Y are interconnected for the purpose of data transfer by means of a data bus between the I/O control unit of computer X and I/O interface of computer Y. If a portion of the program of computer X, or some other information from computer X, needs to be transferred to computer Y, this transfer is made over the data bus. Similarly, if computer Y has information to be transferred to computer X, transfer will be made over the same data bus. Peripheral input/output units connect to computer X via the I/O control unit and to computer Y through the I/O interface. In this way each computer has access to a number of peripheral devices such as tape units, printers, card readers, card punches, disc files, etc.

The Clock (which will be explained in more detail later with reference to FIGURE 2) generates timing signals under the control of advance pulses received on the line MASTER CLOCK from computer X. It is obvious that the Clock may generate its own advance pulse, but for convenience signals available from computer X are utilized. The Clock may be reset by a signal on input line RESET from computer X. This same signal is used to reset the counters via Clock output line A.

Figure 9:
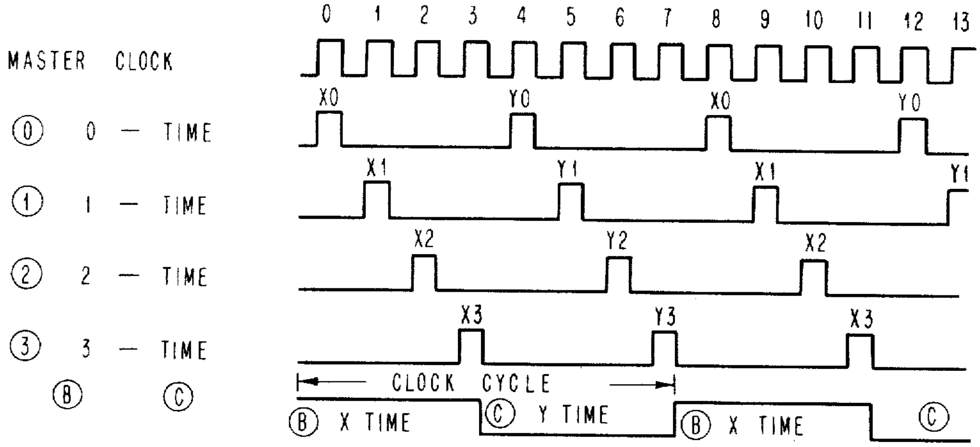
FIGURE 9 is a waveform diagram illustrating signals associated with a clock shown in FIGURE 2.

The output of the Clock is in the form of signals on lines 0, 1, 2, 3, B and C, which are all identified in the legend at the bottom of FIGURE 1*d*. Assuming that the Clock begins from the reset condition, the first advance pulse on the MASTER CLOCK input line from computer X causes a signal to be generated on output line 0 at 0-time. The next signal is transmitted on output line 1 at 1-time and subsequent signals appear in order on lines 2 at 2-time and 3 at 3-time. There is alaways a signal on either line B (Y-time) or line C (X-time), though never on both lines at the same time. After every 3-time signal, the signals on lines B and C change. Referring to FIGURE 9, fourteen MASTER CLOCK advance pulses and the resultant Clock output signals are shown. In this illustration the first operation of the Clock from 0-time to 3-time occurs in X-time and the next operation occurs in Y-time. Y-time is associated with computer Y operations and X-time is associated with computer X operations. In this way signals on computer control output lines representing counter operations such as (counting, setting, etc.) are executed under the control of the Clock cycles, one four-step cycle being alloted to each computer. Therefore, the computers may exert control in sequence avoiding conflicts. For convenience the cycle steps are identified by their step number (0, 1, 2 or 3) and the computer-time (X or Y); for example: "X2 time" which means that there is a signal on the 2-time Clock line while there is a signal on the X-time Clock line.

The counter A and counter B may be standard binary counters of any kind. Each contains three binary stages permitting counting from zero to seven, though the number of stages may be larger or smaller. The counters may be reset at Y2 and X2 times to contain the equivalent of the number zero by signals on an appropriate one of the RESET lines: YA RESET, XA RESET, YB RESET and XB RESET. For instance, a signal will appear on line YA RESET at Y2 time if computer Y specifies a new setting for counter A. Both counters may be reset simultaneously by a signal RESET COUNTERS supplied at input A of each counter at times determined by computer X. Either counter may at X3 or Y3 time (depending upon which computer requests a change) be incremented by a signal on a COUNT UP line or decremented by a signal on a COUNT DOWN line. Though signals on these COUNT lines increment or decrement the counter by one, this is a matter of choice, since the counters may be incremented or decremented by any desired number. A specified number may be set into either counter at X3 or Y3 time (depending upon which computer specifies a "set" operation) by supplying signals on selected ones of the input lines A4=1, A2=1, A1=1, or B4=1, B2=1, B1=1 from the OR circuit to be explained in detail below. For example, the A counter may be preset to contain the number six by applying signals on the input lines A2=1 and A4=1. The contents of counters A and B are indicated by signals on the output lines: A4, A2, A1 and B4, B2, B1. For instance, if the counter B is set to indicate the number five, output lines B4 and B1 will have signals applied to them.

Whatever counts are indicated by output signals from the counters A and B are applied to the associated buffer registers, Buffer A and Buffer B. The Buffer A and Buffer B may be any standard registers having in-gates and out-gates to control the entry or exit of information representative signals. Signals on the output lines of the counters A and B set corresponding bistable stages in the Buffers A and B, which store the contents of the associated counters. The computer X, through its I/O control unit, continually interrogates both Buffer A and Buffer B, thus recognizing the contents of counters A and B. For example, if counter A is set to six and counter B is set to six, the output lines A4, A2, B4 and B2 have signals on them. Therefore, Buffer A will indicate that counter A is set to six and Buffer B will indicate that counter B is set to six. The contents of both Buffer A and Buffer B are recognized by the I/O control unit of computer X.

Computer Y cannot sense the contents of counter A and counter B as stored in Buffer A and Buffer B either automatically or simultaneously; but must sense them one at a time via an OR circuit and the I/O interface upon specific commands. When Buffer A input A GATE has a signal applied to it, the contents of Buffer A are sent to computer Y via the line GATED COUNTER A through the OR block to the I/O interface. When the Buffer B input line B GATE has a signal applied to it, the contents of the Buffer B are sent to computer Y via the line GATED COUNTER B through the OR circuit to the I/O interface.

Buffer B is set to indicate the contents of counter B by a signal at 0-time on line UPDATE BUFFER B. Buffer A is similarly set to indicate counter A contents by a signal on the line UPDATE BUFFER A at 0-time. Interlock circuitry prevents changes in the contents of either buffer (even though the contents have geen adjusted and 0-time occurs) if computer Y has gated the buffer contents to its I/O interface but has not completed sensing the information. This interlock circuitry is part of the Computer Y Buffer Gating circuitry.

The computer Y not having an I/O control unit, and not being able to sense the buffers simultaneously, must have an external unit for sequentially supplying the contents of Buffer A and Buffer B to its I/O interface. The block labeled "Computer Y Buffer Gating," shown in more detail in FIGURE 9 to be explained in detail later, performs this function. When the computer Y output line GATE COUNTER B IN has a signal applied to it, the output line B GATE from the Computer Y Buffer Gating block enables the output of Buffer B, sending signals on the line GATED COUNTER B IN to the computer I/O interface via the OR block. These signals continue until a signal on the SERVICE RESPONSE input line indicates that computer Y has fully sensed the information. When the computer Y output line GATED COUNTER A IN has a signal applied to it, the output line A GATE of the Computer Y Buffer Gating block has a signal applied to it, causing the Buffer A to be read out on the line GATED COUNTER A to the OR block and I/O interface of computer Y. These signals also continue until a signal on the SERVICE RESPONSE line occurs. It is a programming error to attempt to read one buffer before the other has been fully sensed by computer Y. In summary, though the buffers normally are updated every Y0 and X0 time by Computer Y Buffer Gating output signals on lines UPDATE BUFFER B and UPDATE BUFFER A, the contents of Buffer A and Buffer B should not be changed until computer Y has completed sensing their values; as indicated by SERVICE RESPONSE signals. Therefore, signals on the lines UPDATE BUFFER A and UPDATE BUFFER B at X0 and Y0 times cannot occur, if the computer Y signals GATE COUNTER B IN or GATE COUNTER A IN have not been followed by SERVICE RESPONSE signals.

The counters are controlled by the Counter A Step Controls and Counter B Step Controls which will be explained in more detail with reference to FIGURE 7. The controls for the counter A and for the counter B are identical units. Each receives signals from computer X and computer Y indicating the direction of count. The Counter A Step Controls receive signals from the computer Y on the line Y STEP UP and from the computer X on the line X STEP DOWN. The Counter B Step Controls receive signals from the computer X on the line X STEP UP and a signal from the computer Y on line Y STEP DOWN. In accordance with timing signals on lines B, C, 1 and 3, the requests of computers X and Y are transfered to the counters on COUNT-UP and COUNT-DOWN lines at times Y3 and X3. If there is a Y STEP UP request to the Counter A Step Controls, a COUNT-UP signal goes to counter A at Y3-time. X STEP-DOWN requests go to the counter A at X3-time as signals on the COUNT-DOWN line from the counter A Step Controls. Similarly X STEP-UP and Y STEP-DOWN signals to the Counter B Step Controls result in signals on lines COUNT-UP and COUNT-DOWN to counter B at X3 and Y3-times, in that order. As a result simultaneous commands to the same counter are effective sequentially.

The output of each of the counters is sensed by the associated Counter Step Controls in order to prevent incrementing and decrementing after the counter has reached seven, so that there will be no "over-running" of the counter past its limits.

The X Set Register and Y Set Register, which will be explained later in detail with reference to FIGURES 3 and 4, permit the computer X and the computer Y to set desired ones of the counter A and counter B to predetermined quantities specified by the computers. All requests to set the counters from computer X enter the X Set Register on lines SET 4 TO 1, SET 2 TO 1 and SET 1 TO 1. All requests to set either the counter A or the counter B coming from computer Y are applied to the Y Set Register on lines SET 4 TO 1, SET 2 TO 1 and SET 1 TO 1. Once a number is set into the X Set Register or into the Y Set Register its destination is determined by signals on the input lines: XA SET, XB SET, YA SET, and YB SET. Signals appear on these lines at X3 and Y3 times in accordance with output signals from computer X and computer Y indicating the counter into which a number is to be set. When there is a signal on one of the lines XA SET or YA SET (at times X3 and Y3 respectively), the "set" signals stored in the corresponding one of the Set Registers are gated through an OR circuit into the counter A set inputs (A4=1, A2=1, and A1=1). If there is a signal on the lines XB SET or YB SET (at X3 and Y3 times, in that order) the contents of corresponding ones of the X Set Register and the Y Set Register are gated through the OR circuit to the inputs (B4=1, B2=1, B1=1) of the counter B. In this way computer X and computer Y may indicate the number to be set into either one of the counters A or B, or both. The setting will be transferred to the proper counter at the proper time in accordance with the routing instructions of the computer X or computer Y. For example, computer X may indicate that counter A is to be set to four. The X Set Register will receive a signal on line SET 4 to 1 and will store this. At X3 time the X Set Register will receive a signal on line XA SET causing a signal to appear on output XA4=1 which is transferred to the counter A input A4=1 via the OR circuit.

The contents of each Set Register are reset to zero a fixed time after signals (if any) appear on the connected A SET and B SET lines. The Y Set Register RESET signal is used to reset the Counter Set Controls, explained below, via line Y CYC RESET. For expediency, the X Set Register reset circuitry is placed in the Counter Set Controls so that an X CYC RESET line must be supplied to carry the RESET signal for the X Set Register.

The Counter Set Controls, which will be explained later in more detail with reference to FIGURES 5 and 6, connect the computer X and computer Y control outputs to the X Set Register and the Y Set Register. The Counter Set Controls receive inputs from computer X on lines X SET COUNTER A and X SET COUNTER B and from computer Y on lines Y SET COUNTER A and Y SET COUNTER B. These lines indicate which counter is to be set to the number indicated by signals on the SET output lines of the computer sent to the X Set Register and to the Y Set Register. At times (X3 and Y3) determined by signals on inputs B, C and 3, the Counter Set Controls cause signals to be set to the X Set Register and the Y Set Register on the interconnecting lines XA SET, XB SET, YA SET, YB SET, as previously explained with reference to the Set Registers. The two lines Y CYC RESET and X CYC RESET, as previously explained, carry signals for resetting the Counter Set Controls and the X Set Register after the Y Set Register and X Set Register have been read into the counters. The lines YA RESET and XA RESET carry signals at Y2 time and X2 time in that order to reset the counter A to zero when there is a signal on Counter Set Control input line X SET COUNTER A or Y SET COUNTER A to prepare them (at 0-time) for the transfer (at 3-time) of information from the X Set Register and the Y Set Register. The lines YB RESET and XB RESET function in a similar manner, at times X2 and Y2 respectively, in response to counter B commands received on lines X SET COUNTER B and Y SET COUNTER B to reset the counter B prior to setting a number into it from the Set Registers.

The operation of the detailed embodiment of the invention shown in FIGURES 1*c* and 1*d* and the following table will now be described.

*Table*

| Clock Cycles | Program X (Computer X) | Program Y (Computer Y) |
|---|---|---|
| 1. | 11. Reset | 51. ------ |
| 2. | 12. ------ | |
| 3. | 13. ------ | 52. ------ |
| 4. | 14. ------ | |
| 5. | 15. Set B=4 | 53. Set A=7 |
| 6. | 16. ------ | |
| 7. | 17. Step Down A | 54. Step Up A |
| 8. | 18. ------ | |
| 9. | 19. ------ | 55. ------ |
| 10. | 20. ------ | |
| 11. | 21. ------ | 56. Step Up A |
| 12. | 22. ------ | |
| 13. | 23. ------ | 57. ------ |
| 14. | 24. ------ | |
| 15. | 25. ------ | 58. ------ |
| 16. | 26. ------ | |
| 17. | 27. Step Up B | 59. ------ |
| 18. | 28. ------ | |
| 19. | 29. ------ | 60. Gate Counter A In |

Computer X and computer Y processes the program fragments X and Y shown in the table, each computer executing its instructions in step with the other computer. The faster machine, computer X executes two instructions for every one executed by computer Y. Though this synchronism of steps is highly unlikely, and to some extent undesirable, it will suffice for purposes of explanation. Only a few instructions from each program, which best illustrate the operation of the invention, are identified. Each one of the instructions affects one or more of the output lines from computer X and computer Y shown in FIGURES 1*c* and 1*d*. For instance, the eleventh instruction executed by computer X is Reset, which places a signal on the line RESET of computer X.

At X0 time of the Clock (signals on Clock lines 0 and C) an instruction (if any is pertinent) in each program generates signals (if any) on the appropriate computer output lines. Generally these signals remain on the lines for one Clock cycle (X0, X1, X2, X3, Y0, Y1, Y2 and Y3). Operations in accordance with the signals from computer X occur during the X-time steps and those due to the computer Y occur during the Y-time steps.

At the beginning of Clock cycle 1, instruction 11 (Reset) of Program X and instruction 51 (not relevant, as indicated by dashes in the table) of Program Y are reached. The RESET output line of computer X has a signal applied to it, which signal enters the RESET input X of the Clock. As a result, Clock output RESET COUNTERS (labeled "A") causes all counters and registers to be reset to zero. The Clock continues transmitting signals on output lines 0, 1, 2, 3, B and C for four cycles, as shown in FIGURE 9, with no additional effect on the apparatus of FIGURE 1*c* and 1*d* until the next relevant instructions referring to this apparatus are reached at Clock cycle 5.

At the beginning of Clock cycle 5, instruction 15 (Set B=4) of program X and instruction 53 (Set A=7) of program Y are reached. The computer X has outputs on lines SET COUNTER B and SET 4 TO 1, and computer Y has outputs on lines SET COUNTER A, SET 4 TO 1, SET 2 TO 1, and SET 1 TO 1. In this way computer X indicates that counter B is to be set to four, and computer Y indicates that counter A is to be set to seven. At X0 time, this information is stored in the X Set Register by a signal on the input line SET 4 TO 1, and into the Y Set Register by signals on the lines SET 4 TO 1, SET 2 TO 1, and SET 1 TO 1. The following inputs of the Counter Set Controls have signals applied to them at X0 time: X SET COUNTER B and Y SET COUNTER A. At X2 time the Counter Set Controls cause input line XB RESET of the counter B to be signaled, insuring that counter B is set to zero. At X3 time the Counter Set Controls output line XB SET has a signal applied to it which causes the contents of the X Set Register to be read through the OR circuit to the counter B. After a fixed delay, the X Set Register is reset by a signal on line CYC RESET. Thus at X3 time the input B4=1 of the counter B has a signal on it, setting the counter B to the number four and placing a signal on the B4 output line of the counter B. In this way the counter B is set to the number indicated by the computer X.

At Y0 time of Clock cycle 5, Buffer A and Buffer B are updated due to signals on the lines UPDATE BUFFER B and UPDATE BUFFER A from the computer Y buffer gating circuitry. In this way Buffer B is set to the number (4) contained in counter B. At Y2 time the input line YA RESET of counter A has a signal applied to it by the Counter Set Controls, insuring that the counter A is set to zero. At Y3 time the input line YA SET of the Y Set Register has a signal applied to it, causing the contents of the Y Set Register to be transferred to the counter A via the OR circuit. After a fixed delay the Y Set Register is reset to zero, and a signal resetting the Counter Set Controls is sent via the line Y CYC RESET. Therefore, at Y3 time, the counter A input lines A4=1, A2=1, and A1=1 have signals applied to them. The counter A is set to the number seven which brings up the counter A output lines A4, A2 and A1.

At the beginning of Clock cycle 7, instruction 17 (Step Down A) of program X and instruction 54 (Step Up A) of program Y are reached. At X0-time the UPDATE BUFFER A and UPDATE BUFFER B lines have signals applied to them causing Buffer A to assume the state representative of the number (7) stored in counter A. The number (4) still stored in counter B is again entered into the Buffer B. At this time also the output lines STEP DOWN COUNTER A of computer X and STEP UP COUNTER A of computer Y have signals applied to them, which signals are transmitted to the line X STEP DOWN of the Counter A Step Controls, and the line Y STEP UP of the Counter A Step Controls. At X3 time, the output line COUNT DOWN of the Counter A Step Controls has a signal applied to it, causing the counter A to be decremented by 1 (to the number six), signals being applied to output lines A4 and A2. At Y0 time of Clock cycle 7, the Buffer A is updated, receiving the number (6) from the counter A. Buffer B again receives the number four. At Y3 time the Counter A Step Control output line COUNT UP has a signal applied to it, causing the counter A to assume states representative of the number seven. As a result, the counter A output lines A4, A2 and A1 have signals applied to them. Thus the simultaneous instructions "Step Down A" and "Step Up A" have been given sequential effect.

At the beginning of Clock cycle 11, instruction 21 (not relevant) of program X and instruction 56 (Step Up A) of program Y are reached. At X0 time the Buffer A is updated to contain the new number (7) in the counter A. Buffer B again is updated to the number four. At X0 time also, computer Y output line STEP UP COUNTER A has a signal applied to it, which is transferred to the line Y STEP UP of the Counter A Step Controls. At Y3 time of Clock cycle 11, the COUNT UP output line of the Counter A Step Controls will not have a signal applied to it (though normally it would) because the Counter A Step Controls input lines A4, A2 and A1 carry signals from the counter A indicating that the counter A is at its maximum count of seven. Therefore, the signal normally applied to the COUNT UP output line will be blocked.

At the beginning of Clock cycle 17, instruction 27 (Step Up B) of program X and instruction 59 (not relevant) of program Y are reached. At X0 time Buffer A and Buffer B will be updated to the value (7) in counter A and the value (4) in counter B, in that order. At X0 time the output line STEP UP COUNTER B of computer X has a signal applied to it, which signal is transferred to the line X STEP UP of the Counter B Step Controls. At X3 time the COUNT UP input line of the counter B will have a signal applied to it, causing the counter B to change its state from one representative of four to one representative of five, signals being placed in counter B output lines B4 and B1. At Y0 time of Clock cycle 17, the UPDATE BUFFER B and UPDATE BUFFER A lines have signals applied to them, causing Buffer B to assume the state of counter B (5) and Buffer A to reassume the state of counter A (7).

At the beginning of Clock cycle 19, instruction 29 (not relevant) of program X and instruction 60 (Gate Counter A In) of program Y are reached. At X0 time, the output line GATE COUNTER A IN of computer Y will have a signal applied to it, causing a signal to appear on the computer Y buffer gating input line GATE COUNTER A IN. A signal appears on Buffer A input line A GATE, causing the contents (7) of Buffer A to be transferred to the I/O Interface of computer Y via the line GATED COUNTER A and the OR circuit. The lines UPDATE BUFFER B and UPDATE BUFFER A are blocked at this time to prevent any changes in the buffer contents while computer Y is sensing Buffer A. Note that the computer X I/O Control Unit has been continually interrogating Buffer A and Buffer B to determine their contents.

The operation of the apparatus of FIGURES 1*c* and 1*d* for the program fragments of the table has been described. The construction of the Computer Y Buffer Gating, the Counter Step Controls, the Counter Set Controls, the Set Registers and the Clock is obvious from the functions described for each of these blocks. However, the illustrated embodiments of these circuits will now be briefly described.

FIGURES 2 through 8 detailed logic diagrams of portions of the detailed embodiment of this invention shown in FIGURES 1*c* and 1*d*. Input lines appear on the lefthand side of each diagram, and output lines appear on the righthand side. Each line is identified by a legend and an indication of its source or destination (by figure number or by a character designation). The letters N, P and W as part of a line legend indicate different magnitudes of the input or output voltages. The signs "+" or "—" preceding thes eletters indicate the polarity of the voltages. The blocks in the diagrams are lettered to indicate the functions performed. For instance, triggers are indicated by the letter "T," each trigger having outputs "1" and "0" and inputs "S" ("set" to the "1" state), "C" ("complement" or state reversing), and "R" (reset to the "0" state). Except for triggers, the "true" output of a logic block is the bottom output line. The upper output line carries signals which are the complement of the "true" line. A sign before a logical letter indicates the polarity of inputs that will give a positive true output for the function. For instance, if there is a "+" before the "A" of an AND circuit, the block performs the logical AND function (with a positive output) for positive inputs. If there is a "—" before the "A," then the same positive true output occurs if the inputs are negative. If the output of a block occurs from the top of the block, then the complement of the indicated function occurs (for a positive output). For instance, if the inputs to a +O block are both +P, and the output is taken from the top of the +O block, there will be a —N output signal whenever either one or both of the inputs is +P. There will be a +N output on the upper "complement" output line if neither of the inputs are +P. The bottom "true" output will be +N if either or both of the inputs are +P, and will be —N if neither of the inputs are +P.

Figure 2:
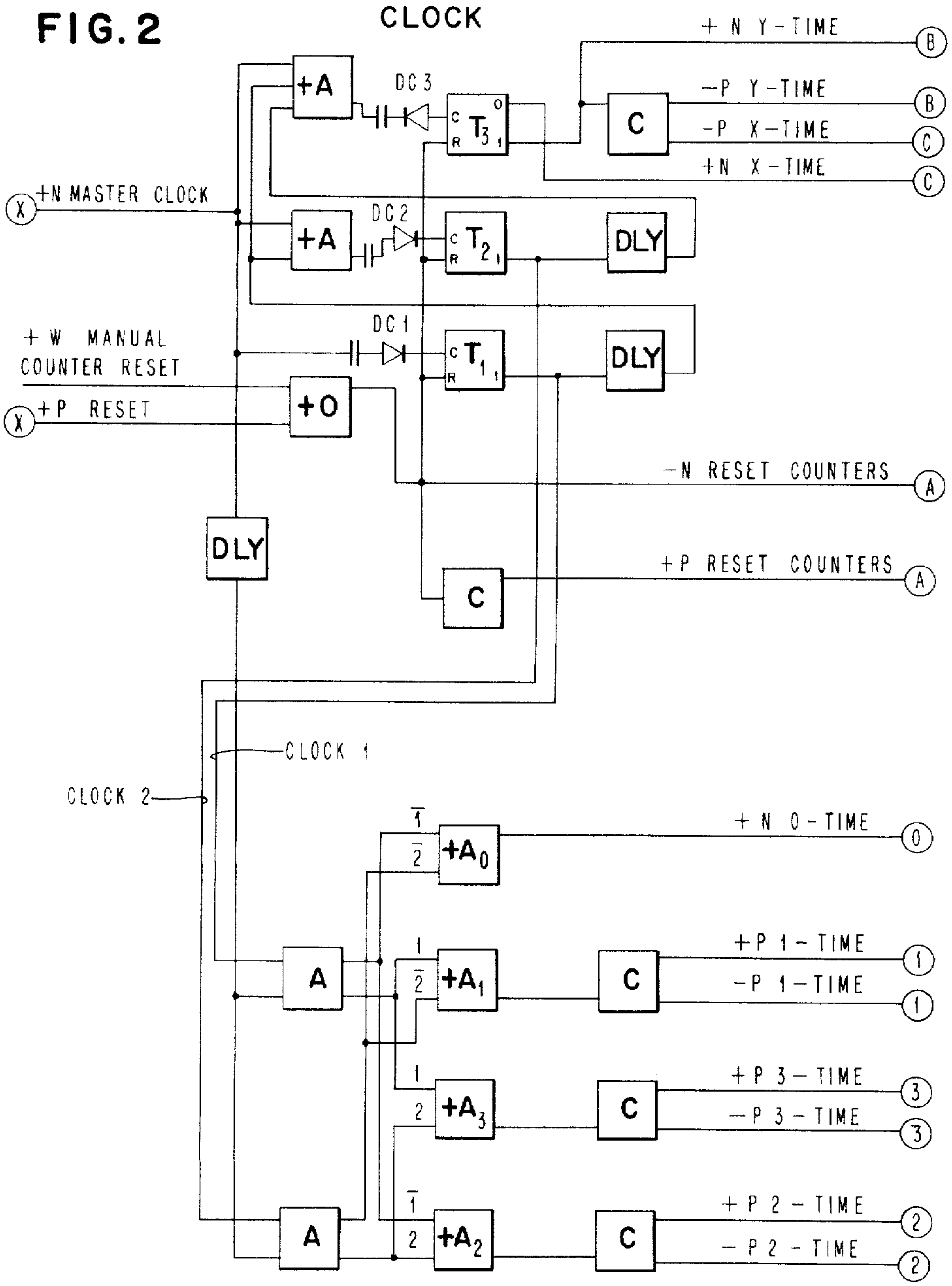

The clock is shown in FIGURE 2. The operation of this circuit will be best understood if reference is also made to the timing diagram of FIGURE 9. Inputs MASTER CLOCK and RESET are received from the computer X. The input MANUAL COUNTER RESET permits control from any additional source desired. The computer X and manual RESET inputs are used to reset the Clock and all other triggers, including the triggers found in the counters, by means of a signal on the two output lines RESET COUNTERS (labeled "A" in FIGURES 1*c*, 1*d* and 2). The signals on the MASTER CLOCK input line cause signals to appear on the following output lines in the order indicated: 0-TIME, 1-TIME, 2-TIME and 3-TIME. Signals appear on the lines Y-TIME and X-TIME alternately, a signal being retained on one or the other during each sequence of signals from 0-TIME to 3-TIME. A change of signals between lines Y-TIME and X-TIME occurs at the end of each 3-TIME signal.

Initially the triggers T1, T2 and T3 are set to the 0 state by a reset signal applied via one of the RESET inputs to the reset input R of each one of the triggers. A signal thus appears on the two output lines X-TIME. Neither of the lines CLOCK 1 nor CLOCK 2 have a signal on them at this time. Subsequently the first MASTER CLOCK advance signal (positive-going edge due to the diode-capacitor combination DC1) is applied to the complement input C of trigger T1. The MASTER CLOCK signal is also applied to the inputs of the AND circuits +A associated with the triggers T2 and T3, but does not have any effect because these AND circuits are enabled only if triggers T1 and T2 are set to 1. The CLOCK signal is further applied, after a delay, to the inputs of the two AND circuits A, placing a signal on inputs $\bar{1}$ and $\bar{2}$ of the AND circuit +A associated with the 0-TIME output line. The 0-TIME signal will be terminated at the end of the first MASTER CLOCK signal due to disabling of the AND circuits A. As a result, there is an output on line 0-TIME for the duration of the MASTER CLOCK signal, trigger T1 is set to the 1 state, and a signal is placed on the CLOCK 1 line.

The next signal on the MASTER CLOCK input line is applied to the complement input of trigger T1, to the two AND circuits +A associated with the triggers T2 and T3, and to the two AND circuits A. Since there is a signal on the CLOCK 1 line, but not on the CLOCK 2 line, the AND circuit +A, having inputs marked 1 and $\bar{2}$ will emit an output signal which results in signals on the two output lines 1-TIME. This second MASTER CLOCK input signal is also applied to the trigger T1 and to the two AND circuits +A, all inputs to the AND circuit associated with trigger T2 being present, trigger T1 still being in the 1 state at this time. The positive-going edge (due to the diode capacitor combinations DC1 and DC2) of the two enabled AND circuits +A outputs will be applied to the complement C inputs of the triggers T1 and T2, causing T1 to be set to the 0 state, and T2 to be set to the 1 state. As a result, there is a signal on the line CLOCK 2, but there is no signal on the line CLOCK 1.

The third pulse on the MASTER CLOCK input line is applied to the complement C input of the trigger T1, to the inputs of both AND circuits +A associated with triggers T2 and T3, and to the two AND circuits A. As a result, the AND circuit +A2, having inputs $\bar{1}$ and 2, will emit an output signal causing a signal to be transmitted on the two lines 2-TIME for a period substantially corersponding to the duration of the MASTER CLOCK signal. The MASTER CLOCK pulse is applied to the complement input C of the trigger T1, causing it to be set to the 1 state. Since the trigger T1 is initially set to 0, one of the inputs of the AND circuits +A associated with each of the triggers T2 and T3 is disabled, blocking the complement input to these triggers. Therefore, only the trigger T1 is reversed, it being set to the 1 state. Trigger T2 remains set to the 1 state, and trigger T3 remains set to the 0 state. There will be signals on the lines CLOCK 1 and CLOCK 2.

The fourth MASTER CLOCK pulse causes the AND circuit +A3 having inputs 1 and 2 to emit a signal at its output placing signals on the lines 3-TIME to transmit signals for a period determined by the duration of the MASTER CLOCK signals at the AND circuit A inputs. Since triggers T1 and T2 are both set to the 1 state, both AND circuits +A will be enabled. Triggers T1 and T2 will be reversed by the rise of the MASTER CLOCK signal due to the orientation of the diode-capacitor combinations DC1 and DC2. When the MASTER CLOCK signal ends, the negative fall of the output of the AND circuit +A associated with the trigger T3 results in a signal at the complement input C of trigger T3 (due to the reverse orientation of the diode-capacitor combination DC3), setting it to the 1-state, the Y-TIME lines having signals applied to them. Triggers T1 and T2 are now set to the 0 state. Trigger T3 has been set to the 1 state, the signal on the line X-TIME having been replaced by a signal on the line Y-TIME.

The fifth input on the line MASTER CLOCK again results in signals on the 0-TIME outputs and reverses the trigger T1 to the 0 state. The operation just described is repeated with the exception that trigger T3 is initially set to the 1 state, and remains so set until the end of the next 3-TIME pulse.

The X Set Register appears in FIGURE 3. The triggers T each store signals representative of bits of a number to be set into the counters by signals received from computer X to input lines X SET 4 TO 1, X SET 2 TO 1 and X SET 1 TO 1. The signals are applied to the set inputs "S" of the triggers T causing signals to be applied to the outputs "1" of those triggers associated with an input signal. For example, if computer X has requested that the number seven be set into the counters, all three triggers T will emit signals from their "1" outputs. The counter to which the number set into the triggers to be directed is indicated by signals on the lines XA SET and XB SET, which come from the computer via FIGURE 5. A signal on one or the other of these lines will gate the numbers stored in the triggers to the proper counter by means of the AND gates —A. In the example, if there is a signal on the line XA SET, indicating that the counter A is to be set, then three (of six) AND —A circuits will be enabled, causing the trigger outputs to be transferred to proper ones of the lines XA4=1, XA2=1 and XA1=1. If the line XB SET is signalled, then three other AND circuits —A will be enabled causing the contents of the triggers to be transferred to the proper ones of the lines XB4=1, XB2=1 and XB1=1. A signal on line CYC RESET (which occurs whenever there is a signal on either line XA SET or line XB SET) causes all the X Set Register triggers T to be reset.

The Y Set Register is shown in FIGURE 4. It is identical in operation to the X Set Register just described except that the signals on the lines Y SET 4 TO 1, Y SET 2 TO 1 and Y SET 1 TO 1 come from computer Y. The destination of the signals indicated by these lines, and stored in the triggers T, are indicated by signals on lines YA SET and YB SET from FIGURE 5. Signals from the triggers directed to the counter A are transmitted on lines YA4=1, YA2=1 and YA1=1. Signals from the triggers directed to the counter B occur on proper ones on the lines YB4=1, YB2=1 and YB1=1. The triggers of the Y Set Register are reset after a signal on the line RESET COUNTERS or after a signal on either of the lines YA SET and YB SET. The reset signal is transferred to the circuit of FIGURE 6 by means of the line Y CYC RESET.

The OR circuit is shown in FIGURE 3. The OR circuit comprises six OR blocks —O having outputs A4=1, B4=1, A2=1, B2=1, A1=1 and B1=1. These lines go to proper ones of the counters A and B as indicated by the letters "A" and "B" on the lines. For example, line A4=1 connects to the 4-bit position input line of counter A, carrying a signal when that counter bit position is to be set to one. Thus, the signals from the X Set Register and Y Set Register may be transferred to the input of counters A and B.

Figure 5:
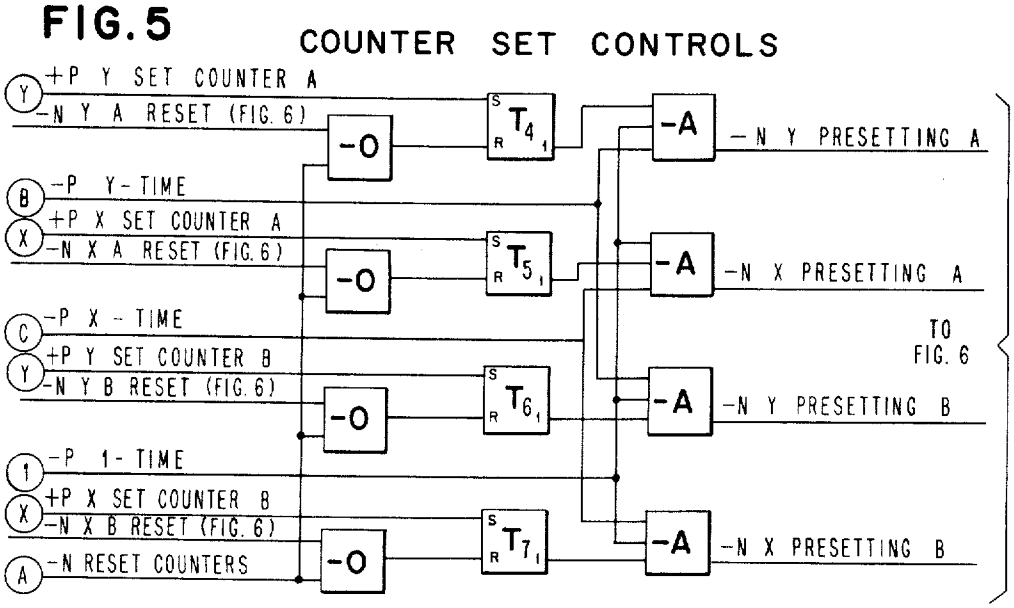
Figure 6:
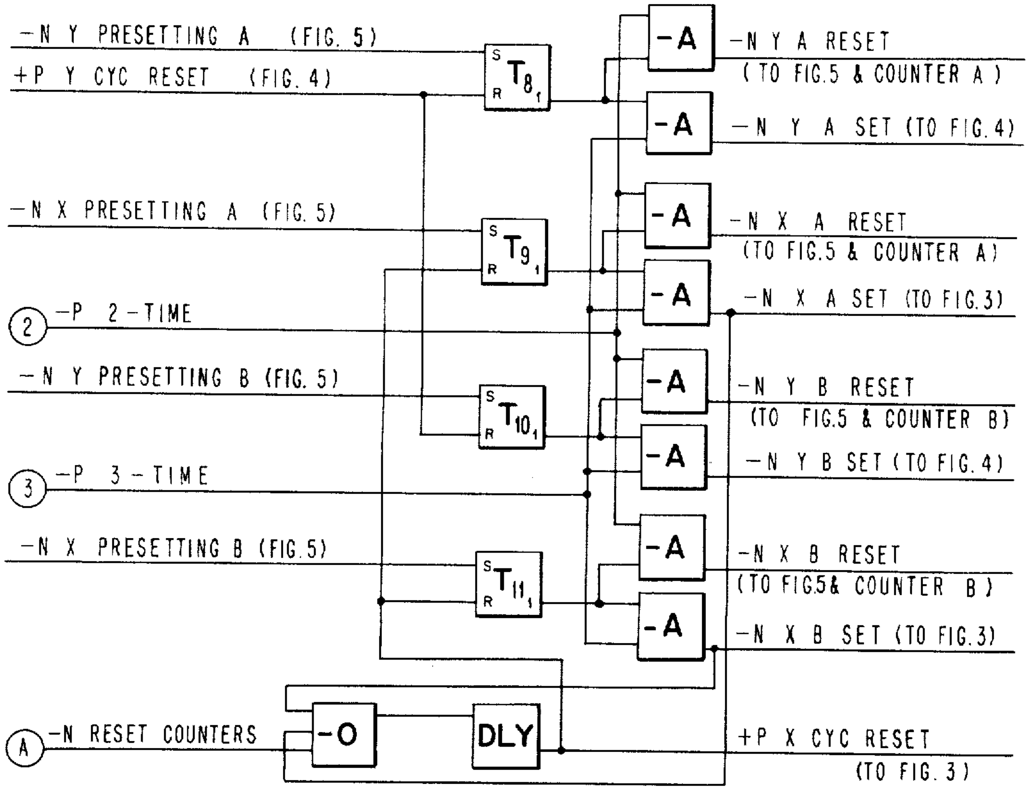

The Counter Set Controls shown in FIGURES 5 and 6 enable the computer Y and computer X to selectively set indicated numbers into the counters A and B. This circuitry permits each computer to request a setting at any time without conflict with the other computer. Each computer may request a setting of the same counter without conflict. The circuit of FIGURE 6 generates the "Set" signals (on lines YA SET, YB SET, XA SET and XB SET) which control the X Set Register and Y Set Register previously explained with reference to FIGURES 3 and 4. The circuit of FIGURE 6 also generates "A Reset" and "B Reset" signals (on lines YA RESET, XA RESET, YB RESET and XB RESET) which reset the counters immediately prior to the time that they will be set, so that the new information will not conflict with the old information.

Referring to FIGURE 5, the fact that one or more of the counters is to be reset by one or more of the computers is indicated by the states of four triggers set by signals on proper ones of the following lines: Y SET COUNTER A, X SET COUNTER A, Y SET COUNTER B and X SET COUNTER B. For instance, if computer Y wishes to set counter A, then the trigger T4 is set to the "1" state by a signal at its set input S from the line Y SET COUNTER A. At Y1 time, as indicated by signals on input lines Y-TIME and 1-TIME, the triggers T4 and T6) associated with the set requests of computer Y are interrogated by AND circuits —A indicating "1" states by signals on the output lines: Y PRESETTING A, X PRESETTING A, Y PRESETTING B and X PRESETTING B. Thus, if computer Y wishes to set a number into counter A, there will be at Y1 time an output signal on the line Y PRESETTING A. If computer X wishes to place a number into counter B, then there will be an output signal on line Y PRESETTING B at X1 time.

Referring now to FIGURE 6, signals on the PRESETTING lines will be stored in the triggers T8, T9, T10 and 11 for use at 2-time and 3-time to generate the proper reset and set signals for the counters. Gating is done by a number of AND circuits —A. For example, if during Y1 time the input line Y PRESETTING A has a signal applied to it, the associated trigger T8 is set to the "1" state, and at Y2 time (when the line 2-TIME has a signal applied to it) there will be a signal on the output line YA RESET which resets counter A as well as the associated trigger T4 in FIGURE 5. For this example, at Y3 time (as indicated by signals on output line 3-TIME) there will be a signal on output line YA SET which causes the number stored in the Y Set Register to be transferred to the counter A as previously explained with reference to FIGURE 4. Similarly, if there was a signal at X1 time on the input line X PRESETTING B, then the associated trigger T11 will be set to "1," at X2 time there will be a signal on output line XB RESET and at X3 time there will be a signal on output line XB SET. There is a signal on output line CYC RESET whenever there is a signal on either the line XB SET or XA SET, this signal being applied to the X Set Register of FIGURE 3 to reset its triggers.

In summary, FIGURES 5 and 6 act together to receive requests from computer X and computer Y to set counters A and B. In conjunction with Clock signals, the requests are first sent to the counters at times proper to reset them in preparation for the new number and secondly to the X Set and Y Set Registers to transfer the new numbers to the counters.

The A Counter Step Controls and the B Counter Step Controls are both shown by the single circuit diagram of FIGURE 7. The inputs and the outputs are identical for both the A Counter Step Controls and the B Counter Step Controls, though the connections to the computers and the Clock vary as indicated by the note at the bottom of FIGURE 7. The A Counter Step Controls receive signals on the line COUNTER STEP UP from computer Y and signals on the line COUNTER STEP DOWN from computer X. The A Counter Step Control controls input lines YX TIME and XY TIME and are connected to the Y TIME and X TIME output lines of the Clock in that order. The B Counter Step Controls receive signals on the COUNTER STEP UP line from computer X and signals on the COUNTER STEP DOWN line from computer Y. The YX TIME and XY TIME input lines to the B Counter Step Controls connect to the X-TIME and Y-TIME output lines, respectively, of the Clock.

The A and B Counter Step Controls serves to receive step-up and step-down requests from the computers directed to either one of the counters and to send count-up and count-down signals to the proper counter at the proper time so that there will be no conflict. Therefore, if one computer attempts to count one counter up and another computer attempts to count the same counter down, both of the requests will be applied to that counter sequentially. Further, the counter step controls block counting of a counter if the maximum contents of that counter are exceeded. For example, if the A counter Step Controls are signaled by computer Y for counting up, or by computer X for counting down on the lines COUNTER STEP UP and COUNTER STEP DOWN, then at X3 time (indicated by signals on lines 3-TIME and XY TIME) there will be a signal on output line COUNT DOWN and at Y3 time (indicated by signals on lines 3-TIME and YX TIME), there will be a signal on the output line COUNT UP. If the B Counter Step Controls are signaled by computer X on line COUNTER STEP UP and computer Y on the line COUNTER STEP DOWN, then at X3 time (signals on lines 3-TIME and YX TIME) the output line COUNT UP will have a signal on it and at Y3 time (signals on lines 3-TIME and XY TIME) the output line COUNT DOWN will have an output signal on it.

Still referring to FIGURE 7, if there is a signal on input line COUNTER STEP UP and the counter does not contain the number seven, as indicated by signals on the input lines COUNTER POS 4, COUNTER POS 2, and COUNTER POS 1, then the trigger TA will be set to the "1" state. If all three of the inputs to the AND circuit −A have signals on them (indicating that the counter contents are equal to seven) the AND circuit +A will be blocked so that the TA cannot be set to "1." If there is a signal on the "1" output of trigger TA, then at 1-time (as evidenced by a signal on the input line 1-time) the trigger TB will be set to the "1" state. When there is a signal on the line YX TIME and on the line 3-TIME, there will be an output on the line COUNT UP. In this way any counter step up request from a computer is given effect at the proper time to advance the counter by one, if the counter is not at its maximum position. Similarly, if there is a signal on the output line COUNTER STEP DOWN, the trigger TC will be set to the "1" state, and at 1-time the trigger TD will be set to the "1" state. When there is a signal on the lines XY TIME and 3-TIME there will be an output signal on the line COUNT DOWN. Whenever there is a signal on either of lines COUNT UP or COUNT DOWN, the associated triggers TA and TB or TC and TD are reset. A signal on the input line RESET COUNTERS will reset all of these triggers at once.

The computer Y buffer gating is shown in FIGURE 8. This circuit acts to gate the contents of the A buffer and B buffer to the computer Y upon signals from computer Y on lines GATE COUNTER B IN and GATE COUNTER A IN. This circuit also contains the logic necessary to update the contents of Buffer A and Buffer B at every 0-time, so that they correspond to the contents of the associated counters. If, however, the computer Y has requested a gate signal from the circuit of FIGURE 8 and has not signaled a service response on the line SERVICE RESPONSE, then there will be no signals on lines UPDATE BUFFER A and UPDATE BUFFER B even though there has been a signal on the input line 0-time.

In FIGURE 8, a signal on input line GATE COUNTER B IN is applied to trigger TE set input "S" to set that trigger to the "1" state, which places a signal on the output line B GATE going to Buffer B. A signal on the input line GATE COUNTER A IN is applied to the set input "S" of trigger TF, which is set to the "1" state, placing a signal on the output line A GATE going to the Buffer A. When either of these signals occurs there is an output from the −OR circuit −O which enables an AND +A circuit at either 1-time or 2-time, as indicated by a signal on the lines 1-TIME or 2-TIME, setting trigger TG to the "1" state and blocking the output of AND circuit +A. Therefore, when there is a signal on the input line 0-TIME there will be no output on the output lines UPDATE BUFFER A and UPDATE BUFFER B. However, when there is a signal on the input line SERVICE RESPONSE to the OR circuit +O, an AND circuit +A is enabled so that at 1-time or 2-time the trigger TG will be reset to the "0" state, enabling the output AND circuit +A, enabling signals on the output lines UPDATE BUFFER A and UPDATE BUFFER B at 0-time. The signal on the line SERVICE RESPONSE also resets the triggers TE and TF, removing signals from the B GATE and A GATE lines. The trigger TG can also be reset by a signal on the input line RESET COUNTERS.

There has been described apparatus for permitting a plurality of computers to work together on the solution of a single problem. Thi sinvention envisions the use of a pair of counters between each adjacent pair of a plurality of computers. There have been described two embodiments of the invention, one of which, utilizing two computers and two counters, has just been described in detail. While the invention has been particularly shown and described with reference to preferred embodiments thereof, it will be understood by those skilled in the art that the foregoing and other changes in form and details may be made therein without departing from the spirit and scope of the invention.

We claim:

1. In combination: first and second program controlled computers each computer having a number of control signal and information signal outputs and a number of inputs including information inputs and count inputs; first and second counters, each counter having a count-up input, a count-down input, and a count signal output; first and second counter-step controls each connected between selected ones of said control signal outputs of one associated computer and the count-up and count-down inputs of one associated counter, each operable to hold count-up and count-down representative signals from the associated computer, and each transmitting said signals to said associated counter count-up input and count-down input non-simultaneously; means, connected between said counter count signal outputs and said computer count inputs, operable to transfer signals representative of said first and second counter counts to said first and second computer count inputs; and, means interconnecting said first and second computer information signal inputs and information signal outputs, operable in accordance with said count representative signals to bi-directionally transfer information signals between said first and second computers.

2. The combination as set forth in claim 1 wherein each of said counters also has a counter reset control circuit and wherein each counter comprises a plurality of denominational orders with a count-set input for each denominational order of each of said counters, a count-set storage means for each computer and a count-set control unit settable by either computer to selectively drive a group of said count-set inputs to set a computer selected one of said counters to the value stored in the count-set storage means of the controlling computer.

3. In combination, at least two program controlled computers, each computer having a plurality of control signal inputs and outputs and a number of information and program data channels, a pair of counters between each pair of computers, each counter having a count-up input, a count-down input, a reset input, and a set input for each denominational order of said counter and each counter providing signal outputs representing the count therein to certain of the control signal inputs of each of the pair of computers connected thereto, a counter-step control for each counter, a first of said pair of computers controlling one counter-step control to cause count-up of its counter and controlling the other counter-step control to cause stepdown of its counter and the second of said pair of computers controlling said one counter-step control to cause count-down of its counter and controlling said other counter-step control to count-up its counter, a clocking circuit having timing signals of two phases and connected to said counter-step control circuits to enable control thereof by one of said computers during one phase and by the other of said computers during the other phase, count signal outputs for each counter, means connecting with of said counter count signal outputs to a control signal input of each of said pair of computers, and means interconnecting a data channel of one of said pair of computers and a data channel of the other of said pair of computers, said interconnecting means being controlled by said count signal outputs to bi-directionally transfer signals between said pair of computers.

4. The combination as set forth in claim 3 and including counter setting controls, said counter setting controls including a pair of count buffer registers, each settable by one of said pair of computers and a counter setting control set by either or both of said pair of computers to first reset all denominational orders of a selected counter to a non-significant value and to then selectively set to a significant value certain denominational orders under control of the buffer register for the computer which set the counter setting control, said counter setting control being also responsive to said clocking signals to respond alternately to setting by said computers.

References Cited by the Examiner

Pages 33–35, March 1956, National Bureau of Standards Technical News Bulletin, vol. 40, No. 3.

Pages 46–58, December 1959, Automatic Control "Duplexing MOBIDIC Computers."

Pilot: Journal of the Association for Computing Machinery, vol. 6, No. 3, July 1959, 313–335.

Pages 71–75, December 1958, Proceedings of the Eastern Joint Computer Conference.

MALCOLM A. MORRISON, *Primary Examiner.*

WALTER W. BURNS, Jr., *Examiner.*